United States Patent

[11] 3,612,869

[72] Inventors John J. Baum
Anaheim, Calif.;
Harold W. Helenberg, Calumet City, Ill.
[21] Appl. No. 14,987
[22] Filed Feb. 27, 1970
[45] Patented Oct. 12, 1971
[73] Assignee The United States of America as represented by the United States Atomic Energy Commission

[54] LARGE VOLUME PLANAR PAIR GERMANIUM (LITHIUM) DETECTOR
2 Claims, 4 Drawing Figs.
[52] U.S. Cl. ....................................................... 250/83 R, 250/83.3 R
[51] Int. Cl. ....................................................... G01t 1/24, H01l 15/00
[50] Field of Search............................................. 250/83 R, 83.3 R; 317/235 (27)

[56] References Cited
UNITED STATES PATENTS
3,524,985 8/1970 Sayres ........................... 250/83.3 R
3,527,944 9/1970 Kraner .......................... 250/83.3 R Primary Examiner—Archie R. Borchelt
Attorney—Roland A. Anderson ABSTRACT: An assembly of lithium-drifted germanium detectors of the planar type combines the good detection characteristics of the planar detector with the large volume of the coaxial drift geometry. The detector assembly is constructed by placing two lithium-drifted germanium detector diodes back to back and connecting them electrically in parallel. The detector is held in a mounting structure which maintains each of the diodes at the same temperature.

PATENTED OCT 12 1971     3,612,869

Inventors
John J. Baum
Harold W. Helenberg

Attorney 3,612,869

LARGE VOLUME PLANAR PAIR GERMANIUM (LITHIUM) DETECTOR

CONTRACTUAL ORIGIN OF THE INVENTION

The invention described herein was made in the course of, or under, a contract with the United States Atomic Energy Commission.

BACKGROUND OF THE INVENTION

There has been widespread use of lithium-drifted germanium detectors (Ge(Li)) in gamma spectroscopy. In a gamma detector there are two events which are competing, the photoelectric effect and the Compton effect. The photoelectric effect produces an output which is approximately proportional to the energy of the gamma ray which is intercepted by the detector. However, the Compton effect produces an additional gamma ray and an output which can be any magnitude depending upon the energies of the initial and secondary gamma rays. Since either event can occur, it is important to use a detector which has a high efficiency, that is one in which any secondary gamma ray produced by the Compton effect is given a chance to be detected by the photoelectric effect before it leaves the detector. That is, the detector should have as large a volume as possible.

The earliest detectors used a simple planar geometry and were limited to detecting volumes of a few cubic centimeters. Advances in planar drifting techniques have resulted in relatively large planar diodes; however, the extremely long time required to construct a planar diode by drifting techniques has limited the volume available. Accordingly, most of the large volume (more than 10 cm.$^3$) detectors now in use have been made in one of the variations of a coaxial drift geometry. While the large volumes and high detection efficiencies obtainable by coaxial drift are a paramount concern in many germanium detector applications, these advantages are accomplished by loss of the simple geometry, uniform electric field and thin window characteristics of planar detectors.

Detectors using a plurality of diodes connected in parallel have been used. However, these detectors did not increase the volume available to a single gamma ray and thus the efficiency of the detector as a whole is the same as the efficiency of each element of the detector.

When lithium-drifted diodes are connected in parallel for use as a single detector, it is important that each diode be cooled equally. If this is not done, then the diodes will develop outputs of different magnitudes for the same gamma ray energy and the detector could not be used as a spectrometer. The supporting structures used with prior art detectors do not provide symmetrical cooling and therefore would not be suitable for use with the detector of this invention.

It is therefore an object of this invention to provide an improved planar lithium drifted detector.

Another object of this invention is to provide a lithium drifted detector of large volume with a uniform electric field and a thin entrance window through the diode edges.

Another object of this invention is to provide an improved mounting structure for a lithium drifted detector.

SUMMARY OF THE INVENTION

In practicing this invention, a planar lithium-drifted detector is constructed by placing two detector diodes back to back so they are electrically in parallel. In a preferred structure, the improved detector can be formed by using two separate lithium-drifted diodes formed in the normal manner, removing the p layer from each and placing the intrinsic layers together, separated only by a very thin conducting foil. The detector can also be formed by drifting the lithium from two sides and stopping the drifting process to leave a thin p layer in the center.

A mounting structure for the diode is provided having a heat sink and a pair of spaced apart arms extending from the heat sink. The diode is placed between the arms and held in a desired position by the arms. Each of the arms provides an equal thermal path to the heat sink so that each half of the diode is cooled equally.

DETAILED DESCRIPTION OF THE INVENTION

Figure 1:
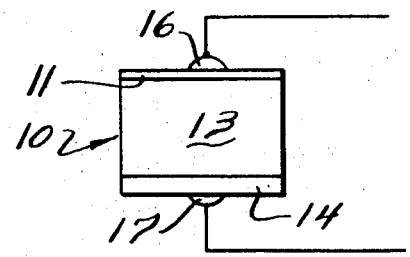
FIG. 1 illustrates a prior art lithium-drifted diode.

Referring to FIG. 1, there is shown a Ge(Li) diode 10 of prior art construction. While the detector diodes of this invention are shown as germanium diodes, other elements such as silicon could be used in place of germanium. Diode 10 includes an extrinsic lithium-rich region 11 and an intrinsic lithium-drifted region 13. Diode 10 also includes a p region 14 into which lithium drift has not been extended. Electrodes 16 and 17 are attached to the lithium-rich region 11 and the p region 14 to provide electrical connection to the diode.

The diode of FIG. 1 has the simple geometry, uniform electric field and thin window characteristics which are desirable for a detector diode. However, because of the large amount of time required for the lithium drifting to take place, the volume of these diodes is very limited. Diodes of appreciable size have required as much as 4 or 5 months for the required lithium drifting to take place. Since lithium drifting is not a linear process, a volume is reached beyond which it is impractical to construct a diode because of the large amount of time required. Therefore, diodes having coaxial geometry are used where large volume diodes are required, even though the characteristics of these diodes are not as good as the characteristics of the planar-type diodes.

Figure 2:
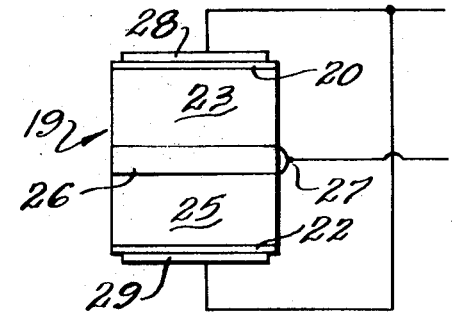
FIG. 2 illustrates one embodiment of the lithium-drifted diode of this invention.

Referring to FIG. 2, there is shown the improved diode 19 of this invention. In constructing this diode, the lithium drifting takes place from both directions to form the structure shown. The extrinsic lithium-rich regions 20 and 22 cause lithium to drift into the intrinsic lithium-drifted regions 23 and 25. The lithium-drifted regions 23 and 25 are separated by a P-type extrinsic region 26 which acts as a conductor placed between the two lithium-drifted regions. Electrodes 27, 28 and 29 provide connections to the diode, with electrodes 28 and 29 being connected together so that the diode regions 23 and 25 are electrically in parallel. Since the regions 23 and 25 are portions of the same crystal, separated only by a very thin P-type region 26, the detector acts as a single diode and not as a pair of separate diodes connected in parallel.

Figure 3:
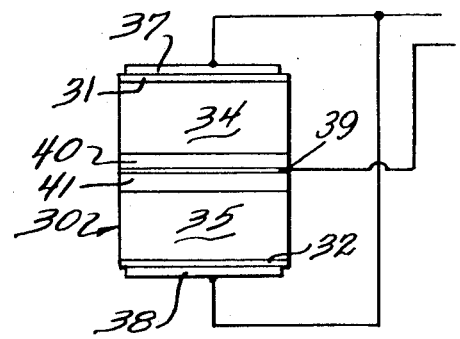
FIG. 3 illustrates a second embodiment of the lithium-drifted diode of this invention.

Referring to FIG. 3, there is shown a second embodiment 30 of the diode of this invention. Extrinsic lithium-rich regions 31 and 32 produce the intrinsic lithium-drifted regions 34 and 35. Electrodes 37, 38 and 39 provide electrical connections to the diodes. The detector of FIG. 3 is formed by constructing a pair of lithium drifted diodes in the usual manner, removing the p region from each and clamping or cementing the diode halves together with a thin conducting layer placed between the diodes. The conducting layer consists of gold layers 40 and 41 evaporated onto the intrinsic region of the diodes and a thin indium foil 39 placed between the two evaporated gold layers. Foil 39 is very thin (e.g., 25 mils) so that the regions 34 and 35 act as a single crystal having a large volume.

Figure 4:
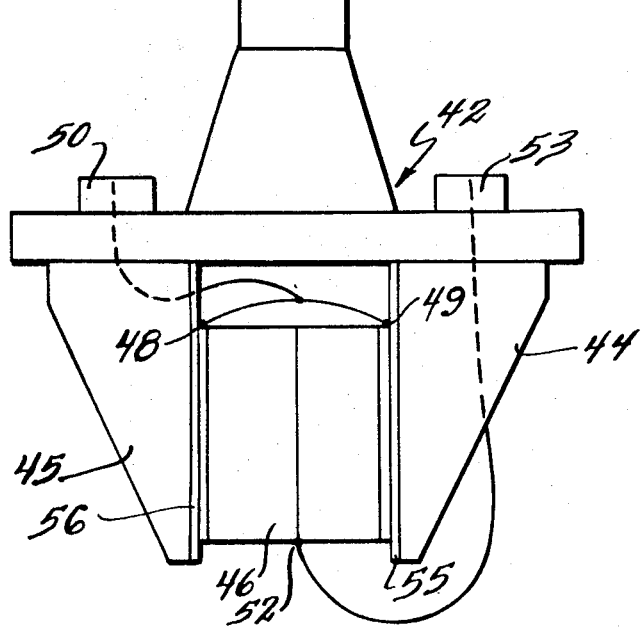
FIG. 4 illustrates a mounting structure used with the lithium-drifted diodes of this invention.

A mounting structure 42 is shown in FIG. 4. The detector diode of this invention consists of two separate lithium-drifted germanium regions and, in the embodiment of FIG. 3, two separate germanium crystals. If the two germanium regions are not cooled symmetrically, a large (20–30° C.) temperature rise will occur across the interface separating the two germanium regions. At different temperatures the two diodes will produce different size pulses and their output cannot be used in a spectrometer.

The mounting structure includes a heat sink 43 which is cooled in a suitable manner, e.g., by placing it in contact with liquid nitrogen. A pair of arms 44 and 45 extend from the heat sink and a detector 46 of the form shown in FIG. 2 or FIG. 3 is clamped between arms 44 and 45. Electrical connections are made from electrodes 48 and 49 to terminal 50 and from the electrode 52 to terminal 53. The diode is insulated from arms 44 and 45 by insulators 55 and 56 which may be of beryllium oxide, sapphire or any solid material with high electrical resistivity and thermal conductivity.

The thermal paths from the heat sink 43 through arms 44 and 45 to the detector 46 are equal so that each half of the detector is equally cooled. This permits detector 46 to operate more accurately than would be the case with a conventional mounting structure in which the thermal paths from the separate portions of the diode are not equal.

The embodiments of the invention in which an exclusive property or privilege is claimed are defined as follows:

1. A planar gamma detector, including in combination a conducting layer, a pair of crystal sections each having an intrinsic region and an extrinsic region, said crystal sections being positioned on opposite sides of said conducting layer with said intrinsic region of each of said crystal sections in close contact with said conducting layer, conductive means connecting said intrinsic regions, a heat sink, first and second spaced-apart supporting arms extending from said heat sink with each having a flat surface at right angles to said heat sink, the detector being positioned between said flat surfaces, said first and second supporting arms acting to clamp the detector in a desired position and further to provide equal length thermal paths from the detector to said heat sink.

2. The gamma detector of claim 1 wherein, each of said flat surfaces of said first and second supporting arms have first and second thermally conductive electrically insulating layers, respectively, said detector being positioned so that one of said extrinsic portions is in contact with said first thermally conductive electrically insulating layer and the other of said extrinsic portions is in contact with said second thermally conductive electrically insulating layer.